United States Patent [19]

Cressey et al.

[11] Patent Number: 4,555,667
[45] Date of Patent: Nov. 26, 1985

[54] SYNCHRONOUS DIGITAL QPSK DEMODULATOR WITH CARRIER ERROR CORRECTION

[75] Inventors: John R. Cressey, College Pk.; Dennis C. Meneely, Bowie, both of Md.

[73] Assignee: Rixon, Inc., Silver Spring, Md.

[21] Appl. No.: 536,140

[22] Filed: Sep. 26, 1983

[51] Int. Cl.[4] .......................... H03D 3/18; H03D 3/00; H03D 3/04; H03K 9/04
[52] U.S. Cl. ...................................... 329/50; 329/107; 329/122; 329/124; 329/126; 375/81; 375/83; 375/94; 375/120; 455/214
[58] Field of Search ................. 329/50, 104, 107, 122, 329/124, 126; 375/81, 83, 94, 120; 455/214

[56] References Cited

U.S. PATENT DOCUMENTS

| | | | |
|---|---|---|---|
| 3,514,702 | 9/1967 | Nahay et al. | 178/67 |
| 3,728,484 | 4/1973 | Hawkey et al. | 178/68 |
| 3,993,956 | 11/1976 | Gilmore et al. | 329/104 X |
| 4,190,802 | 2/1980 | Levine | 329/104 X |
| 4,404,532 | 9/1983 | Welti | 329/50 X |
| 4,439,737 | 3/1984 | Mattie | 329/50 |
| 4,457,005 | 6/1984 | Burke et al. | 375/83 X |

Primary Examiner—Eugene R. LaRoche
Assistant Examiner—D. C. Mis
Attorney, Agent, or Firm—Saidman, Sterne, Kessler & Goldstein

[57] ABSTRACT

Circuitry for decoding differential phase shift keyed signals utilizes a counter, having a capacity selected such that in an integration interval having a duration equivalent to one-half the period of a reconstructed carrier, a full count and resultant rollover identifies a decision threshold for information descriptive of the received signal. At the conclusion of the integration interval, the contents of the counter represent half a full count thereof for no phase error in the reconstructed carrier. Phase error in the carrier is determined during a subsequent interval by counting up of the same counter to achieve a reset condition thereof. The counter is counted up until occurrence of a rollover signal, which signal is used to prevent passage of any further pulses to the counter and to maintain the counter in an all zero state. At the input, a hard limited version of the modulated signal is provided to an EXCLUSIVE OR gate together with the reconstructed carrier in order to provide decoding intervals for counting of clock pulses by the counter during the preset integration intervals.

30 Claims, 25 Drawing Figures

SYNCHRONOUS DIGITAL QPSK DEMODULATOR WITH CARRIER ERROR CORRECTION

TECHNICAL FIELD

This invention relates to quadri-phase shift keyed demodulation systems, and more particularly to digital demodulating circuits for use in such systems.

BACKGROUND ART

The use of phase shift encoding for digital data is widely known. Apparatus and methods for quadri-phase shift key (QPSK) encoding and decoding of information typically provide a phase modulation carrier, having a phase shift with respect to the unmodulated carrier of 0°, 90°, 180° or 270°.

In differential QPSK systems it is known to encode the information by the differential phase shift between baud intervals, rather than by the absolute magnitude of phase shift provided for the carrier during each baud interval.

Prior art approaches to demodulation of a received differential QPSK system signal are complex, and require extensive, expensive arithmetic and logic circuitry for decoding of the received signals. Additionally, where synchronous demodulation is provided, a carrier signal is generated within the receiving circuitry. The carrier signal must be kept at an appropriate phase with respect to the received signals. Error correction circuitry for correction of any phase errors in the internally generated carrier requires complex circuitry having a large component count.

Accordingly, there is a need in the prior art for simplified circuits for use in a synchronous demodulator for phase shift keyed signals.

There is, more specifically, a need for simplified digital circuitry to perform decoding of the received signals and further to provide phase correction for an internally generated carrier.

One digital detection system for differential phase shift keyed signals is disclosed in Gilmore et al. U.S. Pat. No. 3,993,956, wherein analog operations are performed on a received modulated analog signal to decode the digital information contained therein.

The disclosed circuit is quite complex for realization in integrated circuitry, requiring the use of complex matched filter circuits, for example.

A digital demodulator system is described in Nahay et al. U.S. Pat. No. 3,514,702, in which a number of separate counters are used to provide bit decision and phase coherency with the incoming signal transitions.

Another digital demodulator circuit is disclosed in Hawkeye et al. U.S. Pat. No. 3,728,484, similarly requiring complex circuitry together with a plurality of counters.

There is thus a need in the prior art for simplified circuitry capable of demodulating incoming signals and assuring proper phasing of internally generated carriers, preferably utilizing the same circuitry for demodulating the signal and for correcting any phase errors in the reconstituted carrier.

It is accordingly a primary object of the present invention to provide a simplified digital circuit for use in systems for demodulating phase shift keyed signals.

Another object of the invention is the provision of a circuit for synchronous demodulation of a phase shift keyed carrier, in which a reconstructed carrier is corrected by signals generated in the demodulating circuit itself.

It is a more specific object of the invention to provide a synchronous demodulating circuit utilizing a counter both for reaching a decision on decoding a received carrier and for measuring phase differences between a reconstructed carrier internally generated and the transmitted carrier.

Still another object of the invention is the provision of a counter having a full count suitably selected with respect to the internal operating frequencies to provide a half count therein for decoded signal representing any of the four possible phase shifts in a received signal, when an internally reconstructed carrier is in proper phase relationship.

An additional object of the invention is the use of a rollover signal generated by a detecting counter for indicating a decoded value of a received signal, and further for using the time necessary to obtain a rollover signal to correct any error in the internally generated reconstructed carrier.

DISCLOSURE OF INVENTION

In accordance with the foregoing and other objects of the invention there is provided a synchronous digital demodulator for a QPSK system. The demodulator includes a decoding structure for detecting phase shifts of a received signal and an error structure for measuring phase errors between an internally generated reconstructed carrier and a received phase modulated carrier of the received signals. Advantageously, the demodulator includes a feature in accordance with which a single integrator is operable both for detecting the phase shift data and for measuring the phase errors.

Preferably, the integrator includes a counter operable during first and second intervals for producing first and second signals indicative of the received data and of the phase error.

The first signal is preferably produced by the counter upon reaching its full count, thus eliminating arithmetic circuitry otherwise necessary to determine the received data.

A timing and control circuit derives an input signal for the counter from the received modulated carrier and from the reconstructed carrier. The timing and control circuit additionally feeds back the second signal (indicating phase error) to the counter during the second interval in order to provide an accurate indication of any error in the reconstructed carrier.

The timing and control circuit may include an EXCLUSIVE OR gate to provide a dot product of the received phase modulated carrier and the reconstructed carrier, the dot product being gated to the counter only during the first interval.

Additional gating means may be included in the timing circuit to gate a clock signal for counting by the counter in the second interval only so long as necessary to reset the counter.

In accordance with another aspect of the invention, there is provided a synchronous digital demodulator for QPSK signals which includes a counter. The counter provides bit decoding information upon reaching a threshold count when counting clock pulses during a decoding interval. The decoding interval is determined by occurrence of a specified relationship between a received signal and a reconstructed carrier. After the decoding interval, a resetting means is used to countup the counter to a second threshold to reset the counter for a subsequent decoding interval. A generator is provided for signals indicating the reaching of the first or second thresholds by the counter so that a decoding decision is indicated by reaching the first threshold. A terminator circuit is responsive to indication of reaching the second threshold in order to terminate the countup of the counter.

The first and second thresholds may be identical and may represent the full count of the counter. With such an arrangement, the generator may be simplified to provide the signals upon detecting a rollover of the counter from its full count condition to a zero count. Additionally, a timing control circuit may be provided for determining an error counting interval and for generating an interval signal indicative of the existence of the error counting interval. In such a structure, a gate circuit, responsive to the error interval signal, differentiates between the rollover signal generated during the decoding interval and the rollover signal subsequently generated during the countup of the counter.

Responsive to the former rollover signal, the gate circuit provides an information signal as an indication of the decoding decision for the received signal. Additional gating circuitry may be provided responsive to the particular relationship between the reconstructed carrier and the received signal to provide clock signals to the counter for counting during the decoding interval.

Preferably, the timing control circuit provides the counting interval signal to the counter with a duration which is equal to a multiple (one, for example) of the period of a product signal obtained as an EXCLUSIVE OR product of the reconstructed carrier and the received signal. The product signal itself is provided with first and second durations in accordance with the relationship between the received signal and the reconstructed carrier, and the internal clock frequency and counter capacity are chosen such that for both durations of the product signal the counter counts up to substantially identical predetermined terminal counts upon termination of the counting interval. For one of the durations, however, the counter will have rolled over during the decoding intervals included within the counting interval, such a rollover signal being used to indicate the information decoding decision of the circuitry.

The advantage of a substantially identical terminal count for the counter after each counting interval is that resetting of the counter may be achieved by a countup of the same during an error detecting interval. A predetermined interval may be provided to countup the counter to a rollover and reset condition.

Moreover, by providing a substantially identical terminal count for the counter at the end of the counting interval under ideal (i.e., error free) conditions, any errors in the reconstructed carrier produce deviations in the terminal count which may be detected by an error detecting circuit. The error detecting circuit may specifically include structure for determining a time displacement of the occurrence of a full count in the counter after termination of the counting interval.

The error detecting circuit preferably determines a displacement in the length of the interval required to count up the counter to its rollover for reset. The time displacement is indicative of the error in the reconstructed carrier. The error detecting circuit may also include a circuit to determine the condition of one of the counter bits during a predetermined error interval which corresponds to the time necessary for occurrence of the full count after termination of the counting interval. The clock pulses may be counted during occurrence of the selected bit during the error detecting interval, so that the magnitude of the error is determined by the number of pulses counted. More specifically, the error detecting circuit may include means for detecting the condition of the most significant bit of the counter during the error detecting interval.

The error detecting means may include error magnitude detecting means and error direction detecting means for detecting the magnitude and direction of the detected phase error in the reconstructed carrier. The error direction detecting means preferably is responsive to the decoded bit information provided by the counter upon counting of the clock pulses during the decoding intervals.

In accordance with another aspect of the invention, there is provided a digital demodulator for a phase shift key system including a decoder for decoding data received as phase shifts of a modulated carrier and an error detecting circuit for detecting magnitude and direction of phase errors between a reconstructed carrier and the received phase modulated carrier. The demodulator includes a counter operable in two modes, for alternately decoding the data and detecting the phase error magnitude. In response to the decoded data, the phase error direction is determined.

In accordance with yet another feature of the invention, there is provided a method for synchronous demodulation in a phase shift key system which includes the generation of a reconstructed form of a transmitted carrier for the received signal having the data phase shift keyed thereon. The data are decoded by counting clock pulse signals during a sequence of decoding intervals which have predetermined durations and by detecting whether a rollover condition results from the counting step. Additionally, any phase error between the reconstructed carrier and the transmitted carrier is detected. Preferably, such error detection provides detection of both magnitude and direction of the phase error, the magnitude being detected by counting pulses in an interval of a predetermined duration which occurs subsequently to a decoding interval. The direction of phase error is determined by detecting whether a rollover condition results from the counting step performed during the decoding interval.

Still other objects and features of the present invention will become more readily apparent to those skilled in the art from the following description wherein there is shown and described a preferred embodiment of the invention, simply by way of illustration of one of the best modes contemplated for carrying out the invention. As will be realized, the invention is capable of other, different, embodiments and its several details are capable of modifications in various obvious aspects, all without departing from the invention. Accordingly, the drawing and description are provided for illustration, and not for limitation, of the invention.

BRIEF DESCRIPTION OF THE DRAWING

The foregoing and other features, objects and advantages of the present invention will be more readily appreciated upon reference to the following description of a preferred embodiment of the invention, when taken in conjunction with the accompanying drawing, in which.

BEST MODE FOR CARRYING OUT THE INVENTION

Figure 1:
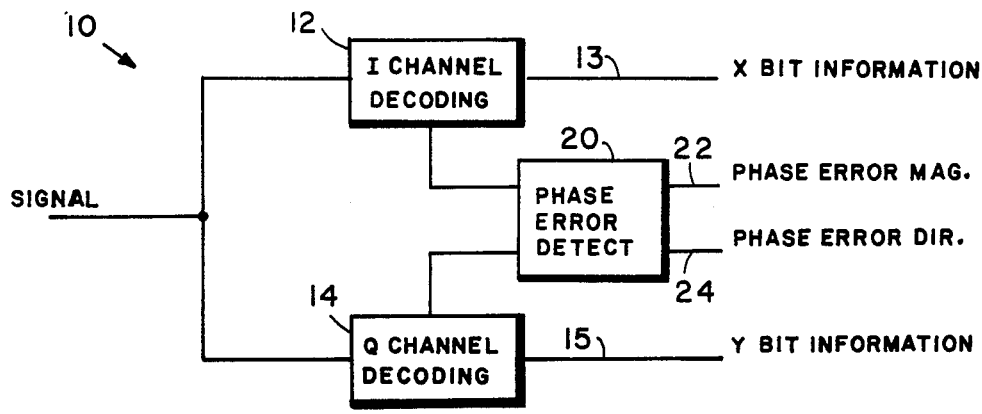
FIG. 1 shows a block diagram representation of a broad concept embodied in the inventive demodulator.

Referring now to FIG. 1, there is generally shown at 10 a preferred embodiment of the present invention. Therein, an input signal is received by the inventive demodulator and decoded to obtain information pertinent to two data bits associated with one baud interval of a QPSK signal. The demodulator includes an I-channel decoding path, shown at 12, for providing information on output line 13 pertinent to an X bit associated with the received signal. The signal is further passed through a Q-channel decoding path 14 for providing information on output line 15 associated with a Y bit of the received signal. A phase error detector 20 is shown as receiving signals generated by the hardware used to generate the X and Y information in the I- and Q-channel decoding paths for providing, on lines 22 and 24, respectively, information pertinent to the magnitude and direction of a phase error between a generated carrier, reconstructed from the received QPSK signal and a carrier consistent with the received signal.

Figure 2:
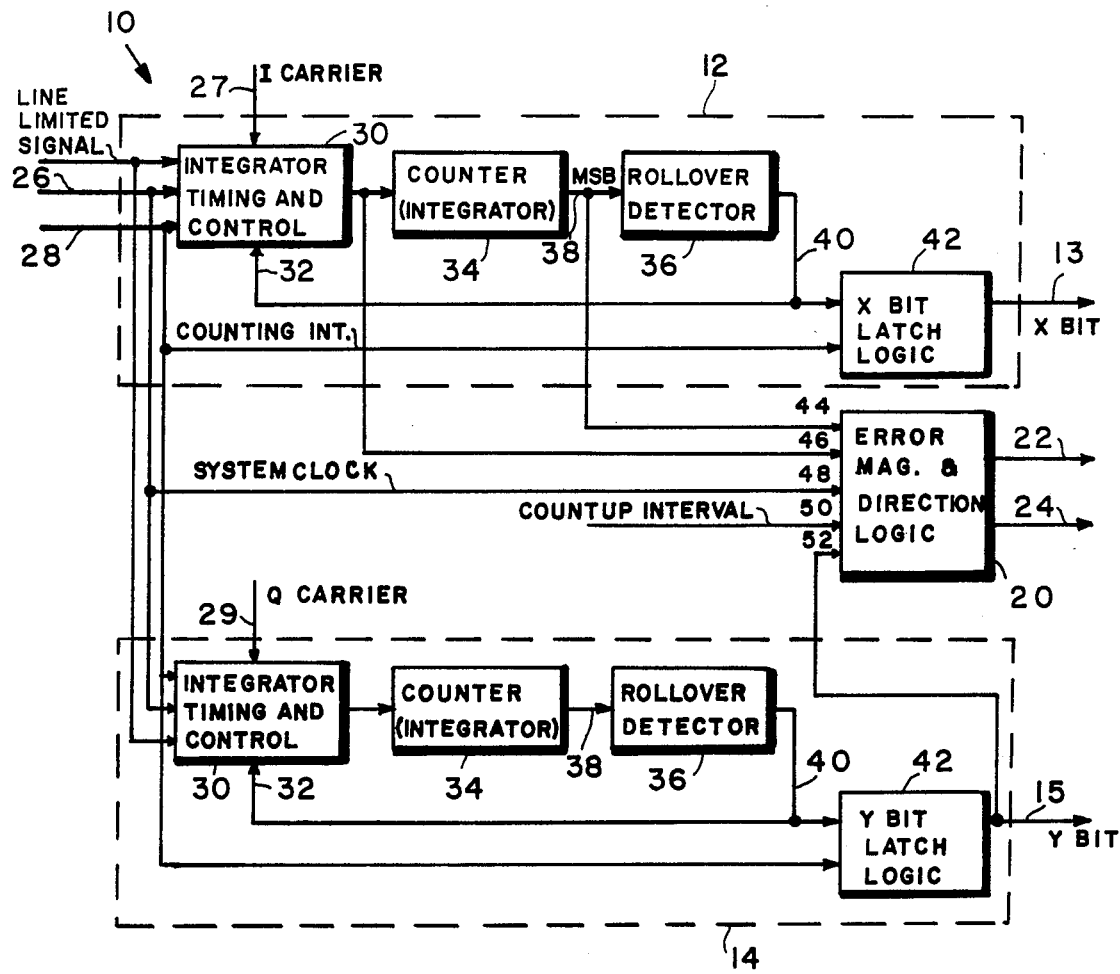
FIG. 2 provides a more detailed block diagram illustration of the inventive demodulator structure.

In order to understand operation of the inventive demodulator, there is provided a more detailed block diagram therefor at FIG. 2.

As shown therein, each of the I-channel and Q-channel decoding paths receives as inputs, in addition to a hard limited version of the QPSK signal, a system clock signal on line 26 and a counting, or integration, interval signal on line 28. These signals, together with a reconstructed form of an I-carrier (in phase) and Q-carrier (quadriture) input respectively on lines 27 and 29, are provided to paths 12 and 14.

The circuitry utilized in each of the paths 12 and 14 is preferably substantially identical, with exception of a number of output signals taken therefrom. Accordingly, the following description of the components of the I path 12 is equally applicable to the components of the Q path 14, where like numbers denote like components. Specifically, I path 12 includes an integrator timing and control circuit 30 receiving the carrier, the hard limited signal, the system clock and the integration interval signal. Additionally, there is provided a further input to the timing and control circuit 30 at input line 32, originating at a point to be described subsequently.

The timing and control circuit 30, in a manner to be described in the sequel, combines the input carrier thereto with the hard limited signal to provide a periodic output "dot product" signal. This output signal, which is used in decoding the input QPSK signal, is provided during a predetermined integration interval to a counter 34, functioning as an integrator, to enable integration of the hard limited version of the input signal. Preferably, digital circuitry is utilized to provide the various components of the inventive structure. Accordingly, logic gating circuitry (described in the sequel) is provided for integrator timing and control circuit 30 and counter 34 is provided as the integrator. Hereinafter, circuit 34 will thus be referenced as a counter. Counter 34 is used to count the system clock pulse signals during the decoding intervals occurring within the integration interval, more properly referenced as a counting interval, identified by the signal on input line 28.

As will become apparent, the information content of the hard limited signal is decoded with simplified circuitry when counter 34, the system clock on line 26, and the counting interval on line 28 are appropriately chosen. In this event, information decoding of the input signal is easily obtained by detecting the occurrence of a rollover in the counter 34. That is, a rollover detector circuit 36 is provided to determine the occurrence of a full count and a rollover to a reset condition for the contents of counter 34. Toward that end, the most significant bit (MSB) of counter 34 is the only necessary output of the counter, and is provided on line 38 to the rollover detector 36.

Rollover detector circuit 36 provides an output signal on line 40 indicative of the occurrence of a rollover condition. The occurrence of a rollover signal on line 40 during the counting interval represented by the signal on line 28 is latched into a latched logic circuit 42, the circuit providing an output information signal on the appropriate X or Y bit information line 13 or 15.

As is also seen in FIG. 2, the rollover signal output by rollover detector circuit 36 is provided to the integrator timing and control circuit 30 on input line 32. The purpose of providing the rollover signal will become apparent with the subsequent description. However, it should be noted that such feedback is utilized to reset counter 34 subsequent to conclusion of the counting interval. As is hereinafter described, upon conclusion of the counting interval there is provided an error counting interval during which the magnitude and direction of any phase error for the reconstructed carrier are determined. As an advantageous feature of the present invention, the error counting interval provides an expected period of time for counting up counter 34 to its reset position. This period of time is sufficient for, and exactly corresponds to a situation wherein, the reconstructed carrier is in a proper phase relationship to the incoming signal. Any deviation in the actual countup period from the error counting interval represents a phase error in the reconstructed carrier. Thus, occurrence of a rollover signal an output line 40 of rollover detector circuit 36 subsequent to the counting interval defined by the signal on line 28 indicates that counter 34 has been reset and is ready to provide a digital integration of the hard limited version of the input signal during the next integration interval and further that any error in the reconstructed carrier has been detected. Accordingly, the signal on input line 32 to integrator timing and control circuit 30 is used to terminate countup of counter 34 at the conclusiion of an error detection (or countup) interval subsequent to the counting interval.

The phase error detector 20 is shown in FIG. 2 as specifically including magnitude and direction logic, receiving signals both from the I- and Q-channel decoding paths. However, because of the simplicity of the inventive structure, it is not necessary to provide corresponding signals from each of the two paths. Rather, the output pulses of integrator timing and control circuit 30, together with the most significant bit of counter 34, are provided to the phase error detector 20 on lines 44 and 46, together with system clock pulses from input line 26 on line 48 and an error interval (i.e., countup interval) signal provided on input line 50. The error interval signal on line 50 is used to define the expected countup interval for resetting counter 34 subsequent to conclusion of an integration counting interval thereof.

The signals input on lines 44, 46, 48 and 50 are sufficient to provide an indication of the magnitude of any phase error of the reconstructed carrier. However, as will be described subsequently, the output information provided on output line 15 of the Y bit latch logic circuit 42 is further provided on input line 52 for the phase error detector to determine, together with the most significant bit information on line 44, the direction of phase error in the reconstructed carrier.

It should be noted that the MSB and integrator pulse signals provided on input lines 44 and 46 may be obtained from the Q-channel decoding path 14, and the information signal input at line 52 may be obtained from the I-channel decoding path 12, instead of the reverse condition illustrated in FIG. 2. Either approach provides valid indications of phase error magnitude and direction.

In order to understand the concepts behind operation of the inventive circuit shown at FIG. 2, reference is made to FIGS. 3A–3F, showing in solid lines the ideal (error-free) reconstructed I and Q carriers and the four possible input phases for the hard limited input signal, as well as to FIGS. 4A–4H showing (in solid lines) a periodic product signal derived by integrator timing and control circuit 30 from the waveforms shown in FIGS. 3A–3F. Finally, a phase diagram shown at FIG. 5 is utilized in explaining operation of the inventive circuit.

Figure 3A:
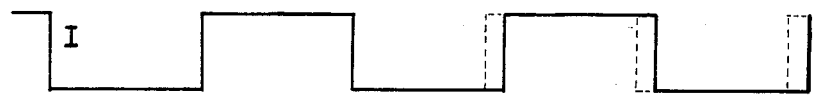
FIGS. 3A-3F illustrate waveforms of the reconstructed I and Q carriers, together with the four possible phases of an input signal to the present demodulator.

Referring now to FIG. 3A, there is shown a waveform generated to represent a reconstructed form of the in phase (I) carrier for the received signal. As is known from general concepts related to QPSK signalling, and particularly with respect to differential QPSK signalling, the data transmitted during a specified baud interval is identified by a difference in phase shift between a preceding and current baud intervals. Since it is only the difference in phase shifts which is of significance, it is accordingly not necessary to reconstruct a carrier having an exact phase identity with the transmitted carrier. In fact, any signal of the form shown in FIG. 3A and having a phase displacement of any integer multiple of 90° therefrom is equally acceptable for decoding the relative phase shift information of the input signal.

More specifically, if the I carrier illustrated in FIG. 3A is shifted by 90°, 180°, 270°, . . . or the like, from the illustrated waveform, no errors will occur in the decoded data.

Figure 3B:
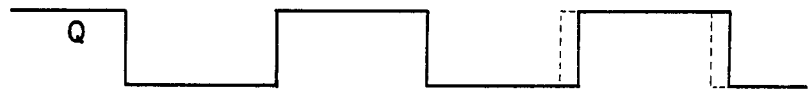

FIG. 3B shows the Q-phase carrier, derived from the reconstructed I carrier, 90° displaced therefrom.

Finally, the waveforms shown at FIGS. 3C, 3D, 3E and 3F illustrate the four possible phase displacements of a hard limited version of a received modulated analog signal. For any one of the received phase displaced signals shown in FIGS. 3C–3F, the information conveyed by that signal during a particular baud interval depends on the phase difference between the received signal and the signal received during the preceding baud interval.

It is further noted that, for proper operation, the reconstructed I carrier should be at a phase displacement equal to an odd integer multiple of 45° with respect to any of the received line limited signals.

Although the received signals are analog signals, the present invention advantageously provides a hard limited version thereof as the line limited input signal to the decoding paths 12 and 14. Thus, pulse responsive digital circuitry may be utilized throughout.

In operation, the received analog signal is preferably sampled and limited at a portion of the baud interval wherein the data are most stable and wherein the least change is provided therefor. Any well known baud locking circuit may be utilized to determine an optimal sampling window as above described. Preferably, such a sample window occurs at the center of a baud interval and has a duration equal to one half the period of the reconstructed carrier.

Since it is the function of the demodulator to determine which of the four phases was transmitted for each baud interval, and since this determination is strongly dependent on having an accurate representation of the transmitted carrier, detection of any phase difference between the reconstructed carrier and the line limited signal (i.e., the hard limited version of the received analog signal obtained, for example, by zero crossing detection) different from an odd integer multiple of 45° is corrected by changing the phase of the reconstructed carrier. Moreover, the unique relationship between the reconstructed I and Q carriers with each of the four possible phases of a received input signal is indicative of information identifying which of the four phases was transmitted and received.

In that regard, in each of the integrator timing and control circuits 30 of paths 12 and 14 of FIG. 2 there is provided circuitry for obtaining a "dot product" of the reconstructed carriers and the line limited signal. More specifically, an EXCLUSIVE OR product of the reconstructed carrier and the received signal is provided. For situations wherein a correct phase relationship exists between the reconstructed carriers and the received signal, all of the possible dot products for the I and Q carriers and the four possible phases of an input signal are shown in FIGS. 4A–4H.

FIGS. 4A–4D show the output of an EXCLUSIVE OR gate receiving at one of its inputs the reconstructed I carrier input to timing and control circuit 30 provided at the input line 27 for path 12 and shown at FIG. 3A, and at its other input one of the four possible phases of the input signal shown at FIGS. 3C–3F. FIGS. 4E–4H show the outputs of an EXCLUSIVE OR gate provided in timing and control circuit 30 in Q-channel decoding path 14, receiving at one input the reconstructed Q-phase carrier shown in FIG. 3B and at the other input one of the four possible phases of the line limited signal shown in FIGS. 3C–3F.

Figure 3C:
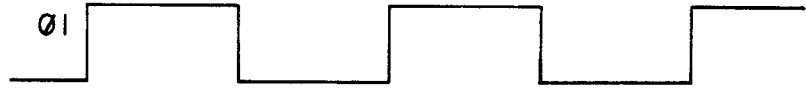
Figure 3D:
Figure 3E:
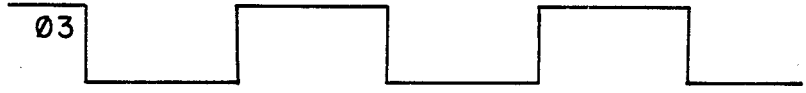

As is apparent from the product waveforms shown in FIGS. 4A–4H, unless absolute phase information is available, the product waveforms of any one EXCLUSIVE OR gate, as shown in FIGS. 4A–4D, for example provide only sufficient information to differentiate incoming signals having a phase shift represented by FIGS. 3A or 3D from incoming signals having a phase shift corresponding to the waveforms shown in FIG. 3B or 3C. In both the former cases (shown in the product waveforms of FIGS. 4A and 4D) it is seen that the product waveform includes a signal having a high level of a duration equal to three times the duration of the low level thereof. In both of the latter cases (shown in FIGS. 4B and 4C), however, the product waveforms provide signals having a high level at a duration equal to one-third the low level. Thus, integration of the product waveform obtained as EXCLUSIVE OR operations of the reconstructed I carrier with the received signals will provide one bit of information during a baud interval, sufficient to identify the incoming signal as having a phase falling either in the set shown in FIGS. 3C, 3F or in FIGS. 3D, 3E. However, as is noted from FIGS. 4E–4H, the waveforms corresponding to products of the received signal with the Q carrier differentiate the received signals as having been one of those shown in FIGS. 3C and 3D or those shown in FIGS. 3E and 3F. That is, integration of the product waveform obtained by an EXCLUSIVE OR of the reconstructed Q carrier with the received signal similarly provides but one bit of information during a baud interval. The information obtained is not redundant, however, and the combined information obtained by integrating a product of the received signal taken with both the I and Q carriers, shown in counters 34 of the I and Q decoding paths 12 and 14, respectively, provides two bit of information per baud interval.

Thus, integrator timing and control circuit 30 of I-channel decoding path 12 provides an EXCLUSIVE OR product of the line limited received signal with the reconstructed I carrier, which may be represented by any one of FIGS. 4A–4D, for integration by counter 34. Similarly, integrator timing and control circuit 30 of Q-channel decoding path 14 provides an EXCLUSIVE OR product of the line limited signal with the Q carrier, represented by the waveforms of any one of FIGS. 4E–4H, for integration by counter 34 of path 14.

A determination of the final count of the counters 34 as corresponding to the short or long expected counts thus provides two bits of information identifying the actual signal as being a specific one of the waveforms shown in FIGS. 3C–3F with respect to the arbitrary reconstructed carriers shown in FIGS. 3A and 3B.

Figure 4A:
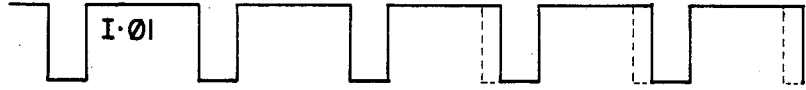
FIGS. 4A-4H illustrate waveforms of periodic product signals derived in the inventive circuit from the waveforms of FIGS. 3A-3F.
Figure 4B:
Figure 4C:
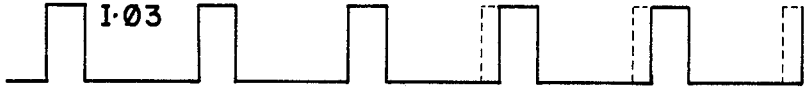
Figure 4D:

As an advantageous feature of the present invention, the counters 34 are selected such that integrating, or counting, the clock pulses of the operating frequency for the demodulator during one-half the reconstructed carrier period for the waveforms shown in FIGS. 4A and 4D will provide a rollover, while counting up of the clock cycles at a selected clock frequency for one-half a carrier period for waveforms shown in FIGS. 4B and 4C does not result in such a rollover. Similarly, the counting of clock pulses for waveforms represented by FIGS. 4E and 4F will result in a rollover while counting of clock pulses for waveforms represented by FIGS. 4G and 4H will not result in a rollover for the counter 34 of path 14. Thus, rollover detector circuits 36 of the two decoding paths 12 and 14 provide output signals indicative of the specific waveform detected during the integration, or counting, interval.

It should be noted that the three-to-one mark-space ratios (or space-mark ratios) of FIGS. 4A–4H result from the proper displacement of the reconstructed I- and Q-carriers from the received signal by an odd integer multiple of 45° and by the integer multiple of 90° phase displacement among the various possible input signals.

Of course, while the counters 34 shown in both paths of FIG. 2 are preferably identical and preferably count the same clock pulse frequency, it is possible to use counters having different capacities and to count clock pulses of different frequencies. In such a configuration, the threshold count for reaching a decision determining the one bit of information from each of the paths might thus be different for the two paths.

However, it is a feature of the present configuration, wherein identical thresholds are provided for paths 12 and 14, that the operating clock frequency is so selected that, for proper phasing of the reconstructed carrier, countup of the clock pulses during one period of the waveforms shown in FIGS. 4B, 4C, 4G and 4H results in a half count of the counter capacity. An advantage of such a selection is that countup during a period of the waveforms shown in FIGS. 4A, 4D, 4E and 4F results in a three-halves capacity count by the counter, thus similarly resulting in a terminal count at the end of the counting period equal to one-half the counter capacity, together with the intermediate production of a rollover signal.

The present invention thus provides (for proper carrier phasing) a simplified decoding of information bits in paths 12 and 14 by detection of occurrence of a rollover during the counting interval. Further, for proper phasing the terminal count at the conclusion of a counting interval is always one-half the counter capacity. Of course, if the counting intervals include more (or fewer) periods of the waveforms of FIGS. 4A–4H, the information content is still detectable as a difference in the number of observed rollovers of the counter during the counting interval.

It is further noted that, for counting intervals of half a carrier period, the foregoing remarks are applicable no matter what the phase relationship between the counting interval and the waveforms of FIGS. 4A–4H. This results from the fact that for any half period of the reconstructed carrier there will be included exactly one full period of the waveforms of FIG. 4. Thus, during such a counting interval, the counter will always count either to one-half or to three-halves its count capacity, whether or not the count is interrupted at some point during the counting interval because of the low level portion of the waveforms in FIG. 4.

In terms of the functioning of the circuit, it is noted that actual decoding of the signals occurs only during the counting within the counting interval. Thus, the high level portions of the waveforms of FIG. 4 may be considered decoding intervals, which occur periodically and during which the counter actually counts during a permissible counting interval determined as a timing window provided on input line 28.

It is seen that, for phase errors resulting in the reconstructed I carrier (hence the reconstructed Q carrier derived therefrom) being shifted from the incoming signal by some phase other than an odd integer multiple of 45°, the periods of the various waveforms shown in FIGS. 4A–4H will remain the same but the duty cycles shown therein will change. An exemplary phase error is shown in the dashed lines of FIGS. 3A and 3B, wherein the I-carrier is erroneously reconstructed with a phase advanced from the proper value therefor. For such phase errors, the decoding intervals within the counting intervals will be of increased or decreased duration from that shown in the solid lines of FIGS. 4A–4H, so that the terminal count on counters 34 at the conclusion of the counting interval will differ from the expected half count. Accordingly, by providing a countup interval, subsequent to the counting or integration interval, sufficient for counting one-half the counter capacity in order to bring the counter to its zero state, the abovedescribed phase errors may be detected by noting that the rollover, expected to occur upon resetting of the counter to its initial state, occurs at a time different from the expected termination of the countup interval. The difference between the time of occurrence of the actually observed rollover and the expected occurrence of the rollover is thus indicative of the magnitude of the phase error, while the indication of whether the difference is positive or negative is indicative of the direction of phase error.

In order better to understand the phase relationships described above, reference is now made to FIG. 5 wherein is shown a representation of the various count considerations pertinent to particular threshold counts used for decision and decoding of the individual bits provided on output lines 13 and 15 as well as for determination of the magnitude and direction of phase error as indicated by signals on output lines 22 and 24.

The sketch in FIG. 5 provides a pair of axes representing counts in counters 34 of decoding paths 12 and 14. The horizontal I count axis represents counts in counter 34 in path 12 while the vertical Q count axis provides counts in counter 34 of path 14, hereinafter referred to as I-counter and Q-counter, respectively.

From the previous description of operation of the invention, it is known that the terminal count on I- and Q-counters 34, for zero phase error in reconstructed carriers, will either be one-half or three-halves of full count value. Accordingly, the horizontal and vertical axes of FIG. 5 are dimensioned in terms of full count to reflect one-half, one, and three-halves of the full counts of the respective counters. Four points have been plotted on the axes and labelled $\phi 1$, $\phi 2$, $\phi 3$ and $\phi 4$, to represent terminal counts for the appropriate waveforms of FIGS. 3C–3F.

Figure 4E:
Figure 5:
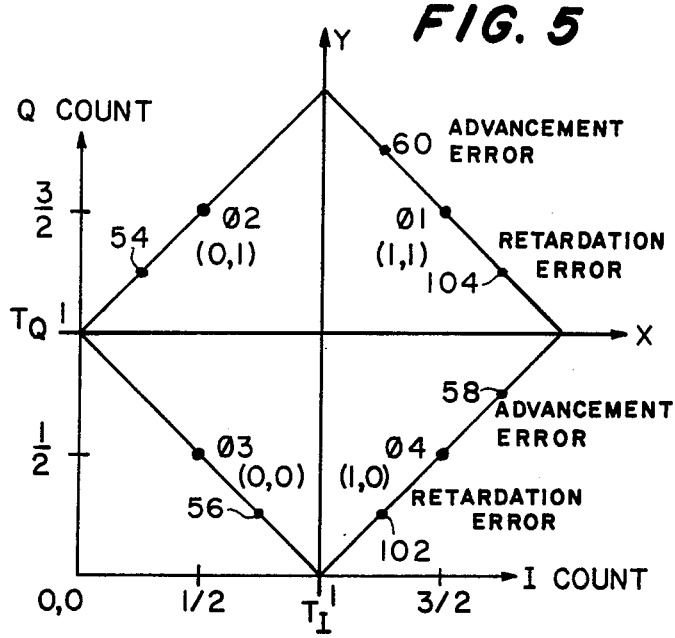
FIG. 5 shows a phase diagram helpful in understanding operation of the inventive structure.

As previously shown with respect to FIGS. 4A and 4E, the dot products obtained when the input waveform is represented by the signal labelled $\phi 1$ at FIG. 3C results in a three-halves full count for both the I- and Q-counters during the counting intervals. Accordingly, upon conclusion of the counting intervals the terminal counts of both counters will be one-half full count, as represented by the point labelled $\phi 1$ in FIG. 5. Of course, both counters will have produced a rollover count during the counting interval, since both counts are, in fact, three-halves of full count.

Figure 3F:
Figure 4F:
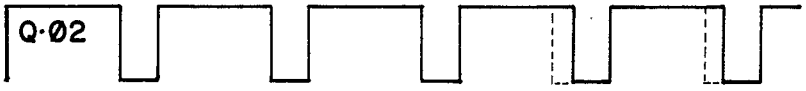
Figure 4G:
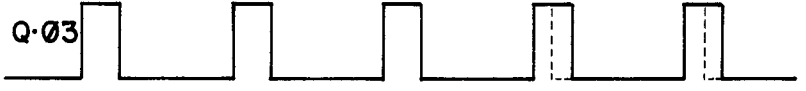

Similarly, upon receipt of an input signal represented by the waveform $\phi 2$ of FIG. 3D, the terminal counts of counters 34 may be seen from FIGS. 4B and 4F to be half count and three-halves count respectively for the I- and Q-counters. Accordingly, the coordinates of point $\phi 2$ in FIG. 5 represent the terminal counts of the I- and Q-counters for reception of an input signal having the phase displacement illustrated by FIG. 3D. Similarly, input signals represented by the phase displacements shown in FIGS. 3E and 3F result in terminal counts of counters 34 equivalent to the coordinates of points $\phi 3$ and $\phi 4$ in FIG. 5.

Upon determining the coordinates of a specific point, i.e., upon determining the terminal counts of the I- and Q-counters, a decision needs to be made as to whether the received signal is represented by the waveforms $\phi 1$, $\phi 2$, $\phi 3$ or $\phi 4$ of FIGS. 3C–3F. In view of the circuit of FIG. 2, the decision is simplified and straightforward, and requires quite simple circuitry, as previously described. By choosing threshold terminal counts for the I- and Q-counters equal to a full count thereof, represented by lines labelled $T_I$ and $T_Q$, the decision on the specific relationship between the phase of the incoming received signal and the reconstructed carrier is made by observing whether a rollover signal was or was not produced for the specific counter during the counting interval. Since the full count indication of a rollover is halfway between the correct, zero phase decoded values, the use of the occurrence of a rollover as a threshold is, in fact, warranted and consistent with an assumption of random distribution of phase errors. Of course, if the statistical distribution of phase errors is known to be skewed in favor of one or another of the received phases, the relationship between the internal clock pulse frequency and the counter capacities may be varied to change the expected terminal counts thereof in order to rely upon a rollover signal as an appropriate threshold. However, where the possible error distribution is random and due to white noise, for example, the equidistant nature of the decoded points from the threshold decision values therefor is proper.

By considering the $T_I$ and $T_Q$ lines as shifted coordinate axes X and Y, it is seen that any point having terminal counts represented by coordinates falling in the first quadrant of the X and Y coordinate axes will be decoded as representing an input signal having a phase relationship $\phi 1$ with respect to the reconstructed carriers, and will result in output signals (1, 1) on lines 13, 15 to indicate that fact. Any input waveform resulting in terminal counts falling in the second quadrant of the X and Y coordinate axes is decoded as representing the input waveform $\phi 2$ of FIG. 3D and results in outputting of bit values (0, 1) on lines 13, 15. Similarly, waveforms resulting in terminal counts falling in the third and fourth quadrants will be decoded as $\phi 3$ and $\phi 4$, respectively, with output signals of (0, 0) or (1, 0) on lines 13 and 15.

In that regard, as an illustrative example, if the terminal counts on counters 34 subsequent to conclusion of a counting interval are such as to produce a point 54 when plotted on the coordinate axes of FIG. 5, i.e., in the second quadrant, the received phase will be determined to be the phase $\phi 2$ shown in FIG. 3D. However, quite clearly an error exists in the phase of the reconstructed carriers, and the error should be corrected so that the terminal counts will more closely approach the half and three-halves value previously described. Such an error may arise either by an erroneous phase, due to external noise, of a received signal, or due to an error in the phase relationship between the reconstructed I and Q carriers and the received signal. Referring to FIG. 3A, there is shown in dashed line an error in the reconstructed I carrier and, since the Q carrier is derived therefrom, a corresponding error in the Q carrier as well. The effects of these errors on the decoding of all the possible input combinations is illustrated in the dashed portions of FIGS. 4A–4H.

Significantly, for each of the waveforms 4A–4H alternate transitions are determined by the transitions in the reconstructed carriers, with the interceding transitions being determined by the transitions of the received signal. Thus, a change in phase of the reconstructed carrier results in a change in the duty cycle of the several waveforms of FIG. 4. In FIGS. 4A, 4B, 4F and 4G, it is seen that the illustrated error in FIGS. 3A and 3B causes a reduction in duty cycle. That is, the ratios of high to low levels for those prouct signals are reduced. To the contrary, the same phase error leads to an increase in the duty cycle of the waveforms of FIGS. 4C, 4D, 4E and 4H. Thus, upon termination of the counting interval, the terminal count of counter 34 may be either higher or lower than the ideal half or three-halves capacity value. Accordingly, merely detecting that the terminal count is higher than the expected value is insufficient to determine the direction of phase error in the reconstructed carrier. Similarly, an observation that the count is lower the expected value therefor is insufficient to determine whether the reconstructed carrier is up shifted or down shifted in phase with respect to the correct value. However, upon plotting in FIG. 5 the terminal counts of the I and Q counters for the dashed line waveforms of FIG. 4 resulting from the illustrated errors in FIGS. 3A and 3B, it is noticed that the erroneous points are plotted at 54, 56, 58 and 60. Each of the erroneous points, while falling in the appropriate quadrant of the X, Y coordinate axes, is seen to be displaced in a counterclockwise fashion from the proper positions for the points $\phi 1$, $\phi 2$, $\phi 3$ and $\phi 4$.

Inasmuch as the same threshold count is provided for both the I and Q decoding paths, and since the phase shift error in the reconstructed Q carrier is the same as that of the reconstructed I carrier, it is seen that the changes in the durations of the high level portions of each of FIGS. 4A-4H are identical in magnitude. Accordingly, the loci of points 54, 56, 58 and 60 for different phase shift errors are represented by the 45° angle lines forming the rhombus of FIG. 5. Any phase error resulting in an unduly advanced carrier leads to a counterclockwise rotation of the detected points from the correct values. Any phase shift error leading to a retardation of the reconstructed carriers from the proper values results in a clockwise rotation of the actually observed points from the points $\phi 1$, $\phi 2$, $\phi 3$, $\phi 4$. Of course, if the error is sufficiently large so that the rotation passes the X, Y coordinates, the signal will be incorrectly decoded. In order to maintain a maximal decoding distance between the received signals and the error thresholds, it is thus necessary to correct the phase shift error and to change the reconstructed carrier so that the detected points once again are at the optimal values therefor.

The present invention provides the required phase error correction which will cause the points 54, 56, 58 and 60 to move successively closer to the ideal locations $\phi 2$, $\phi 3$, $\phi 4$, and $\phi 1$, respectively, on successive baud intervals.

It should be noted that for situations in which the received signals are not hard limited but are carried forward and processed in analog form, the loci of the various points in the X, Y coordinate plane form a circle. Processing the complete amplitude of the received signal, rather than merely the zero crossing data therefor, requires a more complicated circuit utilizing a significantly increased number of parts including, for example, analog-to-digital conversion of the analog amplitude.

Since each of the plots of the actually received data, assuming the data to be within the correct quadrant, is similarly displaced from the correct target point therefor, the actual error may be determined for any one of the received signals and the appropriate correction applied. Further, in view of the differential nature of the QPSK system, even if one of the received points were to be in an incorrect quadrant, only the data for that baud interval would be improperly decoded. The data received in subsequent baud intervals would be decoded in accordance with the phase difference between the subsequent intervals, and accordingly would be properly decoded.

The foregoing analysis of the interplay between the waveforms of FIGS. 3 and 4 to produce the plot of FIG. 5 illustrates the simplified method for error correction available in the present system.

Referring to the diagram of FIG. 2, the count in counter 34 at the end of the counting interval may be used to determine the magnitude of the phase shift error for the reconstructed carriers. Because the count errors in both the I and Q counters will have the same magnitude, as previously described, it is sufficient to utilize information from only one of the counters to determine the phase error magnitude. The present invention, rather than determining the count, decoding the same, and providing an indication of error magnitude, utilizes another approach. The time difference between the expected rollover subsequent to a resetting countup for the counter and the actually observed such rollover is used to provide an indication of error magnitude. In order to clarify this approach, FIGS. 6, 7, 8 and 9 illustrate a number of waveforms and graphical representations of signals occurring in the circuit.

Figure 6:
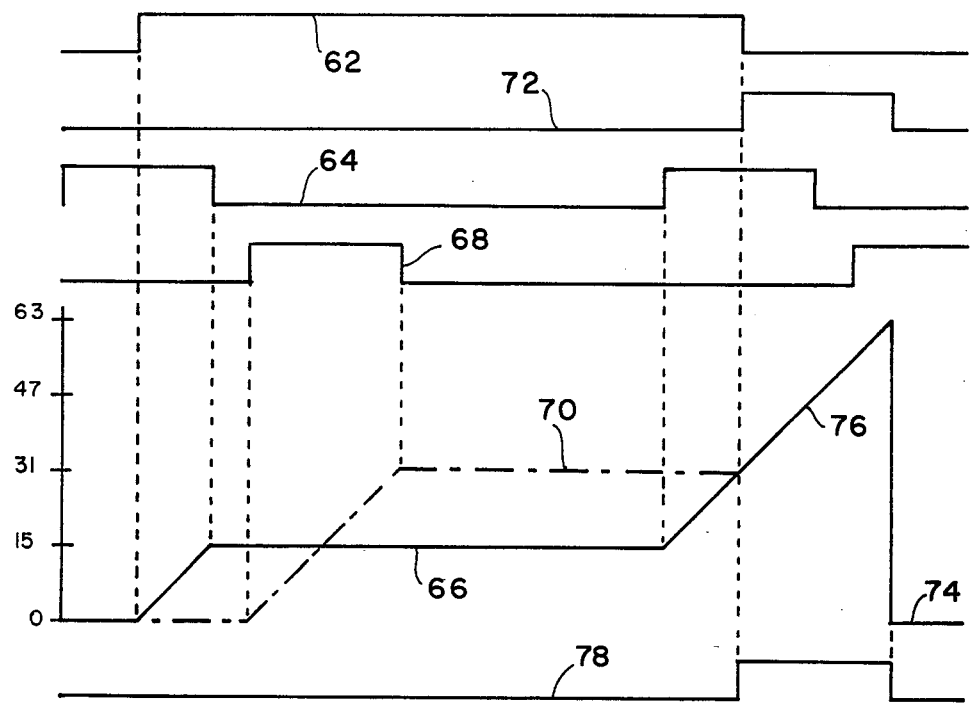
FIGS. 6, 7, 8 and 9 illustrate a number of waveforms and graphical representations of signals occurring in the inventive circuit.

For each of these figures, there is provided a first waveform 62 illustrating a gating signal for the counting, or integration, interval provided on input line 28. FIG. 6 shows, on expanded scale at 64, a dot product waveform which is developed in the timing and control circuit 30 corresponding to one of the waveforms in FIGS. 4B, 4C, 4G or 4H. Illustratively, counters 34 are provided as six bit counters for a clock frequency which results in a terminal count of 31 for any of the waveforms 4B, 4C and 4H, and which results in a terminal count of 95, which is also represented by a count of 31 in a six bit counter, for the waveforms of FIGS. 4A, 4D, 4E and 4F. Although the clock pulses are not shown, waveform 66 is an analog representation of the count in counter 34 during operation of the circuit.

For a situation in which the counting interval is symmetrically placed with respect to the dot product signal, as shown in FIG. 6, counter 34 will count up to fifteen during the initial portion of the counting interval in which the dot product is at a high level, will remain at that value during the portion of the counting interval when the dot product is at zero, and will resume counting of the clock pulses during the latter portion of the counting interval when the dot product is again at a high level. Thus, at the conclusion of the counting interval the count in counter 34 will be 31, represented by zero on the most significant bit and ones for each of the remaining bits thereof, under the assumption of zero phase error. As an illustration that symmetry between the counting interval gating waveform 62 and the dot product of the reconstructed carrier and the received signal need not be symmetrical, there is also shown in FIG. 6 an alternate situation wherein the same waveform of FIGS. 4B, 4C, 4G or 4H is used to decode the incoming signal in a different timing relationship with respect to the counting interval. Thus, in FIG. 6 the numeral 68 is yet another representation of the dot product generated in timing and control circuit 30 during counting interval 62. The resultant count in counter 34 is illustrated by the dashed lines curve 70. It is thus seen that, independently of the phase relationship between the counting interval signal and the dot product, the output of counter 34 will be half the count capacity, i.e. 31, at the conclusion of the counting interval determined by the falling edge of waveform 62. Subsequent to conclusion of the counting interval, although not necessarily immediately thereafter as shown in the figure, there is provided a countup interval gating signal, shown at 72. The signal, which may be externally generated, is input to the error detector in FIG. 2 at line 50.

The countup interval defined by the signal waveform 72 is of the appropriate duration to provide a count of one more than one-half of the count capacity of counter 34. Thus, independently of whether dot product 64 or 66 is used to trigger counting by the counter during the counting interval, counting during the countup interval (for zero phase error) begins at a half capacity count (e.g. 31) and proceeds to a full count (e.g. 63) at which a rollover occurs during resetting of the counter to its zero value as shown at 74. However, it is seen that the countup period will proceed along the portion of the curve shown at 76 for any phase relationship between the counting interval and the dot product waveform.

Figure 7:
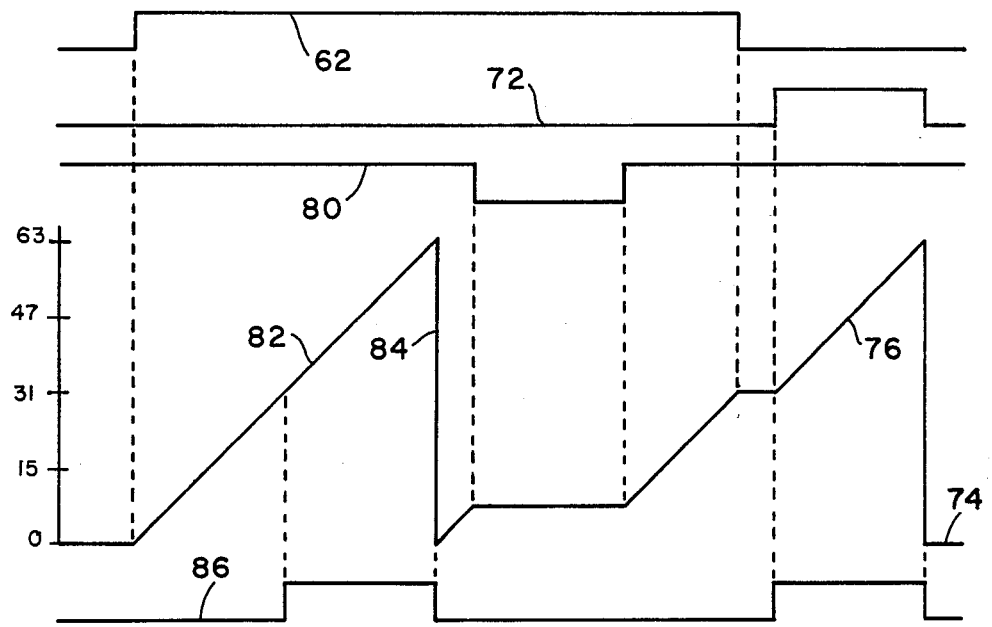

Prior to explaining operation of the error detection facet of the inventive circuit, reference is made to FIG. 7 showing a timing diagram in which no phase error exists for the reconstructed carrier and which illustrates operation of the circuitry for input waveforms resulting in dot product signals shown in FIGS. 4A, 4D, 4E and 4F. The dot product, seen in an expanded scale at 80, is used to cause counter 34 to count up as shown at 82. Unlike the waveforms shown in FIG. 6, however, a rollover occurs some time during the integration interval defined by signal 62 for dot product signals of the type contemplated, inasmuch as the counter has been selected to provide a three-halves full count at the conclusion of the integration interval. The rollover is seen to take place at 84. As has previously been explained, operation for either type of input dot product waveform results in a terminal count equal to half the count capacity, e.g. 31. Further, similarly to the operation described in conjunction with FIG. 6, a countup interval gating signal 72 is provided subsequently to the termination of the counting interval, leading to a countup of the counter as shown in portion 76 of curve 82, and concluding in a rollover resulting in resetting of the counter to its initial state, as shown at 74. Waveform 86 shows the state of the most significant bit of counter 34. Illustratively, the countup interval for FIGS. 7-9 is shown displaced from the conclusion of the counting interval.

Figure 4H:
Figure 8:
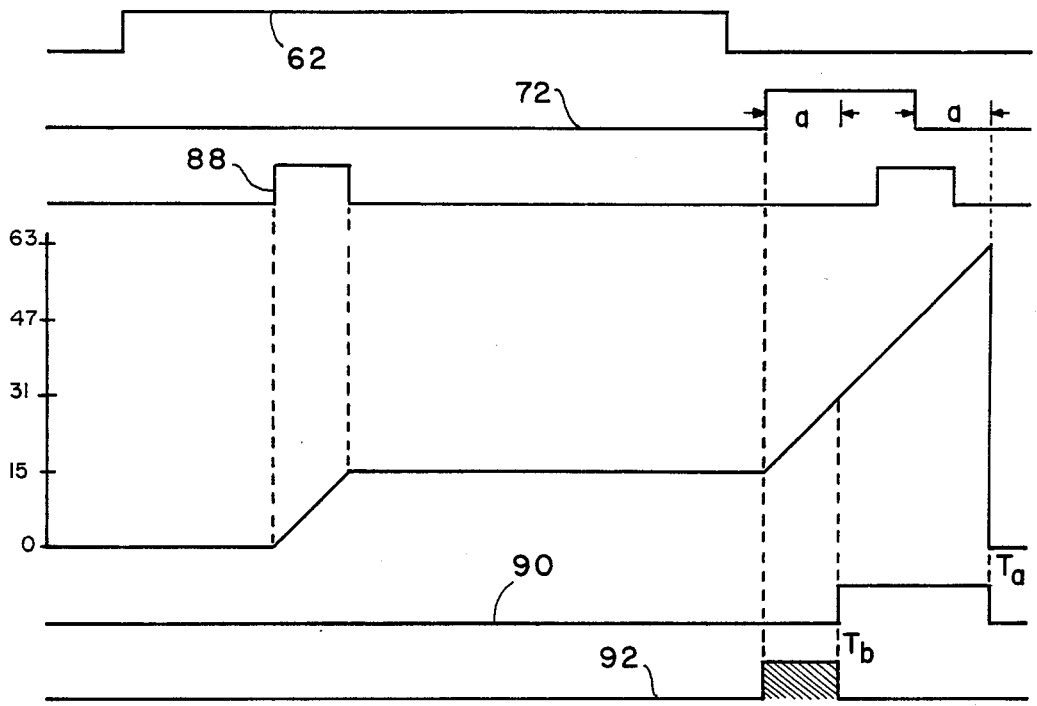
Figure 9:
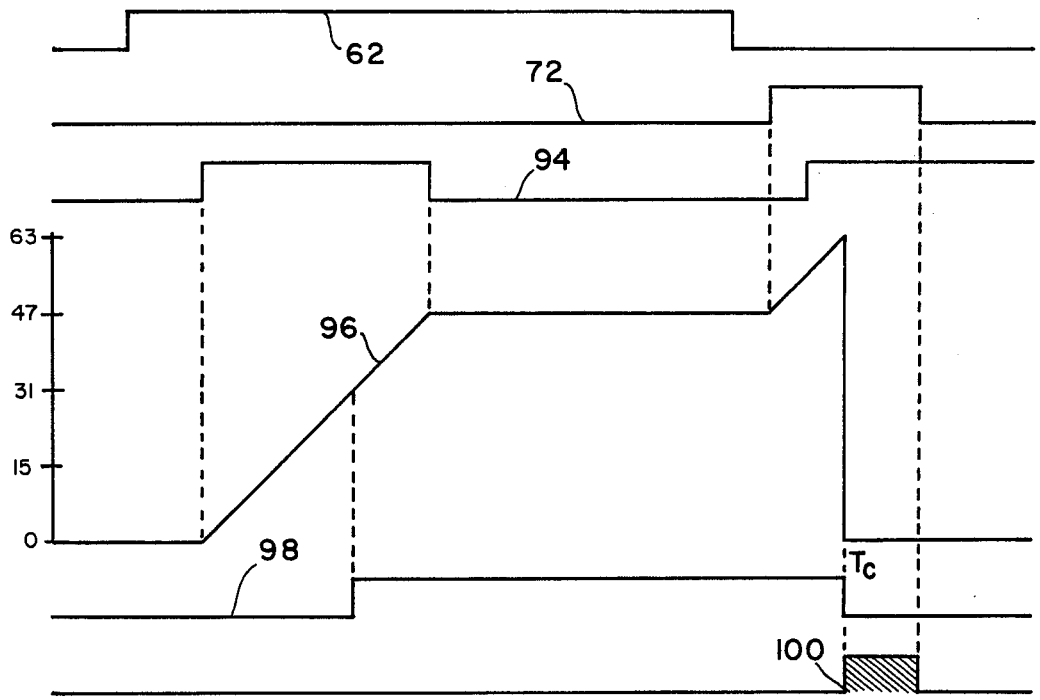

FIGS. 8 and 9 illustrate modifications of FIG. 6 resulting from phase error in the reconstructed carriers. FIG. 8 represents operation of the system when an error results in modification of the dot product waveform as shown in dashed lines in FIGS. 4B and 4G, while FIG. 9 shows modification of the operative waveforms when a phase error results in dot product waveforms as shown in FIGS. 4C and 4H, for example. It should be noted that FIG. 9 might similarly be considered to represent system operation when errors have changed the waveforms of FIGS. 4A and 4F to such an extent that an erroneous decision is made concerning the phase of the received signal.

Referring to FIG. 8, operation is illustrated for a situation wherein the duty cycle of the dot product has been reduced by phase error, as shown in waveform 88. It is thus seen that the terminal count at the conclusion of the count interval is less than half count, and that, if permitted to count up until rollover subsequent to conclusion of the count interval, rollover will not occur until time $T_a$, subsequent to the conclusion of the predetermined countup interval shown at 72.

The time necessary to countup to rollover subsequent to termination of the countup interval may be deduced from the count in counter 34 upon termination of the counting interval. This additional time is linearly indicative of the phase error in the reconstructed carrier causing the reduced duty cycle of the waveform 88. Rather than decoding the counter contents at the termination of the counting interval, however, it is also noted that the time from conclusion of the countup interval to the rollover is equal to the time difference from initiation of the countup interval to time $T_b$, at which the MSB of the counter changes to a higher level. This time is identified by "a" in the waveform 72.

The reason for this relationship is apparent in that the countup interval is substantially equal in duration to the duration of a high level on the MSB waveform 90. Thus, for a countup starting at a lower count and continuing to countup at the same frequency until occurrence of rollover, there results a shifting of both starting and ending edges of the MSB waveform 90 by the same amount with respect to the starting and terminating edges of the countup interval gating signal 72.

Thus, passage of clock pulses or generation of other pulses during the time interval when the MSB is at a low value and the countup gating signal 72 is at a high value provides an indication of phase shift error in the reconstructed carrier, and the number of such clock pulses passed during this interval is indicative of the magnitude of the phase shift error. Waveform 92 indicates the production of such error pulses during the shaded portion thereof.

Referring now to FIG. 9, there are illustrated waveforms for operation of the circuit in a situation wherein the duty cycle of the waveforms is increased, for example, as illustrated by waveform 94. As seen from the resultant count, illustrated by waveform 96, counter 34 in this situation counts up to more than half the count capacity thereof, thus resulting in generation of a high level for the MSB, as illustrated in waveform 98. The MSB maintains its high level until occurrence of rollover at a time $T_c$, an advance of the termination of the countup interval. Again, the presence of an error is noted by occurrence of a condition wherein the MSB is at a low level during the countup interval, and the magnitude of the error may again be determined by the number of pulses passed during the interval wherein the MSB is low and the countup interval gating signal 72 is high. Such pulses are illustrated by the shaded portion of the curve shown at 100.

There has thus been provided a theoretical basis for determining the magnitude of phase shift error in the reconstructed carriers. However, although a number of pulses may be passed (as shown at 92 or 100 in FIGS. 8 and 9) to indicate the magnitude of the error, it has previously been illustrated that the same phase shift error may result in opposing error indications as shown in FIG. 5. Further, the mere provision of error pulses during the shaded portions of the waveforms 92 and 100 itself is not sufficient to indicate whether the counter had too high or too low a terminal count, without further information identifying whether the pulses are transmitted at the beginning or the end of the countup interval 72.

The latter information is easily provided by noting that when the terminal count is too high the counter MSB, prior to termination of the counting interval, is at a high level (see FIG. 9), while when the terminal count for the counter is too low the counter MSB is at a low level prior to termination of the counting interval, as shown in FIG. 8. Thus, the status of the counter MSB prior to termination of the counting interval may be used to indicate whether the terminal count indicated by pulses passed during the shaded portions of the waveforms 92 and 100 represent too high a terminal count or too low a terminal count.

As further indicated, knowledge that the count is too high (or too low) is insufficient to determine whether the phase shift error is due to an advanced or retarded phase of the reconstructed carrier. As will be recalled upon reference to FIGS. 4A and 4D, a phase advance error in the reconstructed I-carrier may result both in too low a terminal count and in too high a terminal count. A similar observation may be made with reference to FIGS. 4B and 4C. Alternatively, though not shown in FIGS. 3 and 4, it may be illustrated that a phase delay error in the reconstructed I-carrier may result in too high a terminal count for the waveform of FIG. 4A and in too low a terminal count for the waveform of FIG. 4D.

Although the waveforms for a retardation error are not shown, the points resulting from such retardation are plotted at 102 and 104 on FIG. 5. Thus, even knowledge that the X bit is one due to occurrence of a rollover during the counting interval (i.e. knowledge that the input signal was at one of the phases $\phi 1$ or $\phi 4$ shown in FIGS. 3C or 3F) together with knowledge that the terminal count was too low, for example, does not provide sufficient information to correct the error. This deficiency results from an understanding that since two low a terminal count may occur in the waveform of FIG. 4A as a consequence of a phase advance in the carrier, and may occur in FIG. 4D as a result of a phase delay in the carrier, as shown a points 60 and 102, respectively, in FIG. 5.

If the specific waveform is known, that is, if the received signal can be identified as being that of FIG. 3C or that of FIG. 3F, so that it is known whether the dot product is that of FIG. 4A or FIG. 4D, then the necessary correction for the reconstructed carrier is known and may be applied. Thus, if it is known that the received signal was, in fact, $\phi 1$ of FIG. 3C, and that the dot product is thus that shown in FIG. 4A, a determination that the terminal count was too low is indicative that a phase advance error has occurred in the I-carrier, and accordingly a retardation of phase is necessary to restore the carrier to its proper phasing.

Thus, the information necessary for deducing phase error direction from a knowledge of terminal count error direction may be provided from bit Y output on line 15, since that bit, in combination with the X bit, identifies the quadrant for the point plotting the observed data on FIG. 5. Accordingly, FIG. 2 provides input line 52 to the phase error detector 20, providing thereon the Y bit information. As will be appreciated, the system may be modified to include the MSB output of the Q counter and the pulses output by the Q path timing and control circuit 30, instead of the corresponding signals from the I-channel decoding path, and to provide bit X from line 13 to the phase error detector 20.

As will be seen from the following description of the specific circuits used to realize the various components shown in FIG. 2, phase error detector 20 provides the pulses shown in the shaded portions of waveforms 92 and 100 on output lines 22 or 24 thereof. These lines are provided as inputs to a variable digital frequency generator, described in a commonly assigned and copending application of John R. Cressey and Stephen A. Miller for a Variable Digital Frequency Generator with Value Storage, U.S. Ser. No. 531,328 filed Sept. 12, 1983 used to generate the reconstructed carrier for controlling the proper phasing thereof.

A number of circuits useful in achieving the above described functions are illustrated in FIGS. 10–13.

Figure 10:
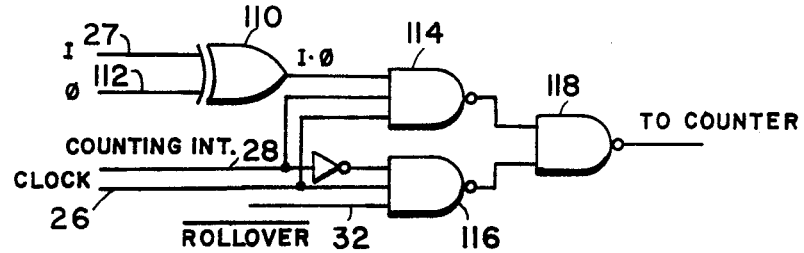

Referring initially to FIG. 10, there is shown an integrator timing and control circuit, represented by reference numeral 30 in FIG. 2. Therein, an EXCLUSIVE OR gate 110 receives at its two inputs a reconstructed carrier on line 27, illustrated by the I-carrier, and the hard limited phase modulated input signal on line 112. The dot product of the reconstructed carrier and the input signal is provided at the output of EXCLUSIVE OR gate 110 to an input of a NAND gate 114. The other inputs to NAND gate 114 include the counting interval signal provided on input line 28 and the system clock signal as provided thereto on input line 26. Thus, NAND gate 114 is enabled to pass the clock pulses to counter 34 upon a simultaneous occurrence of high levels in the dot product signal output by EXCLUSIVE OR gate 110 and the high level value for the counting interval signal on line 28. Counter 34 will thus count the clock pulses occurring during each occurrence of a high level portion of the dot product signal within the predetermined counting interval.

A second NAND gate 116 similarly passes the system clock pulses to counter 30 when properly enabled. The enabling conditions, however, are seen to be the simultaneous occurrence of an inverted counting interval signal on line 28 and the absence of a rollover signal on input line 32. NAND gate 116 provides autozeroing and reset of counter 34 subsequent to conclusion of the counting interval, and specifically provides the countup interval for the counter. Countup for the counter must terminate upon detection of a rollover indication subsequent to conclusion of the counting interval. The input to line 32 is accordingly preferably taken from a latch circuit (not shown) which provides a steady high level output after conclusion of a rollover pulse.

Finally, a third NAND gate 118 combines the outputs of gates 114 and 116 to provide the same as an input to counter 34. As will be appreciated, the output of NAND gate 118 is a logical sum of products of the inputs to the two NAND gates 114 and 116. Accordingly, in view of the foregoing description, it is seen that the circuit in FIG. 10 provides timing control signals for counter 34 in accordance with the concepts illustrated in FIGS. 6–9.

Figure 11:
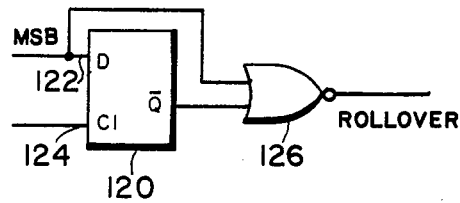
FIGS. 10, 11, 12 and 13 illustrate circuits for carrying out the functions of blocks shown in FIG. 2.

FIG. 11 shows a circuit which may be used to generate the rollover signal utilized in the circuit of FIG. 10, as well as elsewhere in the inventive demodulator. Specifically, the most significant bit of counter 34, provided on line 38, is input to a flip-flop 120. The MSB is provided to the data input 122 of the flip-flop. The data is clocked by the system clock signal 124 (which may be inverted to avoid problems with propagation delay). A NOR gate 126 receives as its inputs the MSB signal input to the data terminal of the flip-flop, as well as the inverted data output of the flip-flop. It should thus be appreciated that the output of NOR gate 126 will be high only when both the inverted data output and the MSB data input to flip-flop 120 are simultaneously low, that is, when the current MSB input is low and the current data output is high.

However, since the current data output represents the data input to the flip-flop one clock pulse period previously, it is apparent that the output of NOR gate 126 is high for that clock pulse cycle in which the MSB changes from high to low, or for that clock pulse cycle during which a rollover in the counter occurs.

The rollover signal may be utilized in the structure of FIG. 2, as has been described throughout the foregoing specification. For example, the signal may be provided to the integrator timing and control circuit 30, as described in conjunction with FIG. 10. Additionally, with reference to FIG. 12, the rollover signal may be provided to a NAND gate 128, together with the counting interval signal. Thus, the output of NAND gate 128 will drop only in response to simultaneously high levels of both the rollover and counting interval signals provided thereon. As will be recalled from the previous discussions, such a condition occurs only when counter 34 exceeds its full count during the counting interval, i.e., when a decoding decision to recognize the presence of a bit is made. Thus, the output of NAND gate 128 is provided to a set input of a set/reset flip-flop 130. For circuits sensitive to positive going transitions, an AND gate may be used to replace NAND gate 128. Further, the system clock signal may also be provided as an input to gate 128 to take into account possible propagation delay within counter 34.

Figure 13:
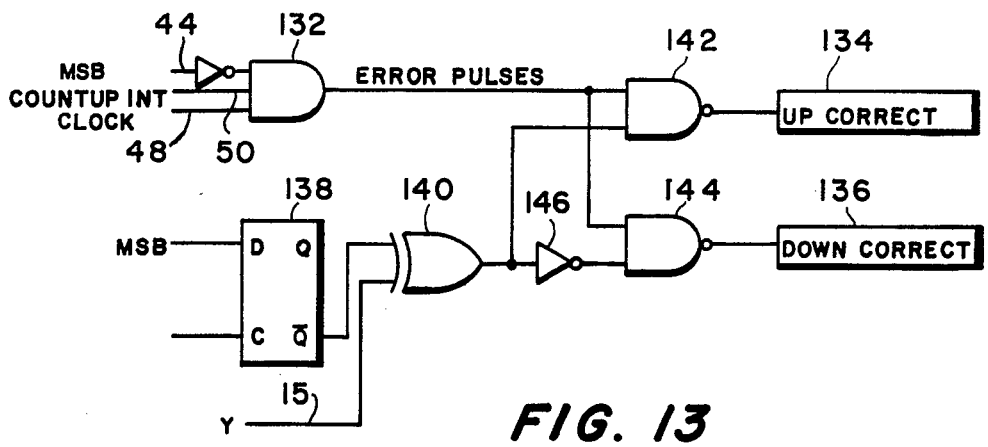

Referring now to FIG. 13, there is broadly shown the error correcting circuitry of the present invention. As is seen from the drawing, an AND gate 132 receives at one of its inputs an inverted form of the MSB signal provided on input line 44 thereto. The countup interval signal provided on input line 50 forms yet a second input to gate 132, while the system clock signal input on line 48 forms the third input to the gate.

From the description of system operation, it will be recognized that the output of AND gate 132, which is formed of a plurality of pulses occurring only when the MSB is at a low level during the countup interval, is precisely the set of error pulses previously described in conjunction with the error detection unit 20. As has further been described with respect to the invention circuit, the error correction pulses provided by gate 132 must be directed either to up or down counters, or to up correction or down correction circuitry, symbolized by blocks 134 and 136, respectively. The remaining circuitry in FIG. 13 forms a digital switch for directing the output pulses from AND gate 132 either to the up correction or to the down correction circuits 134 and 136.

As will be recalled from the description of the inventive circuit, the error pulses should be directed to different correction circuits, depending on the status of the MSB prior to the end of the counting interval. Towards that end, there is provided a data flip-flop 138 receiving the MSB at its data input and a clock signal generated to provide a high level prior to the end of the counting interval at its clock input. An EXCLUSIVE OR gate 140 receives the inverted data output of data flip-flop 138 at one input terminal and the Y bit output on line 15 at its other input. The output of the exclusive OR gate is provided to a pair of NAND gates 142 and 144, with inversion by inverter 146 at the input to NAND gate 144. Thus, for a high value of the output of EXCLUSIVE OR gate 140 it is seen that NAND gate 142 is enabled to pass the error pulses output by AND gate 132, while for a low output value of EXCLUSIVE OR gate 140 it is NAND gate 144 which is enabled to pass the pulses. EXCLUSIVE OR gate 140 and inverter 146, together with NAND gates 142 and 144, thus form a digital switch for the error pulses.

To understand operation of the digital switch in further detail, it should be recalled from the explanation of the waveforms in FIGS. 8 and 9 that presence of a high voltage level on the MSB line prior to termination of the counting interval is indicative of too high a count. Since the clock input to flip-flop 138 provides a sampling pulse for the MSB just prior to termination of the counting interval, the Q output of the flip-flop thus provides a latched signal indicative, for any error pulses, whether the pulses result from an excessively high or low count in the I-channel decoding path during the interval. Similarly, the $\overline{Q}$ output of flip-flop 138 provides a high output level for error pulses occuring as a result of too low a count during the counting interval. As is apparent from FIG. 5, when the I count is too low the error pulses are indicative of a phase retardation error in the third and fourth quadrants of the X, Y coordinates, and of a phase advancement error in the first and second quadrants. Thus, the Y bit input on line 15 to EXCLUSIVE OR gate 140 provides for transmission of the error pulses to the upshift phase correcting circuitry 134 for signals in the third and fourth quadrants in FIG. 5 in which a low count was detected, and to the downshift phase correcting circuit 136 for error pulses detected due to low counts in the first and second quadrants. Similarly, for any given quadrant (e.g. quadrant 1 in which the Y bit is 1) the status of the MSB input to flip-flop 138 determines whether the error pulses are to be interpreted as advancement or retardation error, and whether these pulses are accordingly transmitted to the downshift or upshift correcting circuits 136 or 134, respectively.

Figure 12:
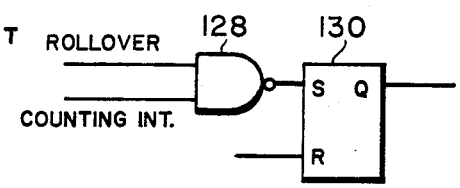

It is further noted that the X and Y bits output by the circuits shown in FIG. 12 are then themselves passed to a standard differential decoder in order to obtain the actual transmitted dibits. Such differential decoders are available commercially, one example being a Datel Modem 12b, available from S.E. Labs (EMI labs), Feltham, Middlesex, England. Such a differential decoder receives the X and Y information, and with appropriate delays provides signals indicative of phase changes between baud intervals, and accordingly of the information dibits.

The foregoing specification has provided a description of a circuit for synchronously demodulating received phase shifted signals and for detection of any phase errors in a reconstructed carrier signal by comparison of the carrier with the then current incoming phase modulated signal. Both signal demodulation and error detection are achieved with the aid of the same counting circuitry for counting pulses during intervals determined by an EXCLUSIVE OR dot product of the received line limited signal and the reconstructed carrier. The counter capacity is chosen such that for the clock frequency utilized in the system, a full count and a resultant rollover occurring during an integration window selected to have a duration substantially equal to one-half the carrier period, provide a threshold count for determining information bits descriptive of the received signal. Further, the inventive system utilizes a countup of the counter to reset the same for the next information decoding interval, and relies upon the number of pulses necessary to reset the counter for determining phase error for the reconstructed carrier.

The foregoing description of a preferred embodiment of the invention has been presented for purposes of illustration, and is not intended to be exhaustive or to limit the invention to the precise forms disclosed, since many obvious modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto, when interpreted in accordance with the full breadth to which they are fairly and legally entitled.

We claim:

1. In a synchronous digital demodulator for a quadriphase shift key system including
   decoding means for decoding data represented by phase shifts of a received signal for successive baud intervals, and
   error correcting means for correcting phase errors between a reconstructed carrier and a received phase modulated carrier of the received signals, the improvement comprising
   integrator means operable both for detecting said phase shift data and for correcting said phase errors
   wherein said integrator means comprises counter means operable during a first, integrating, interval of said baud interval for counting a clocking signal and for producing a first signal indicative of data received during said baud interval,
   said counter means being further operable in a second, error detecting, interval for counting a clocking signal and for producing a second signal indicative of phase error between said received phase modulator carrier and said reconstructive carrier.

2. An improved synchronous digital demodulator as recited in claim 1 further comprising timing means for providing to said counter means an input signal derived from said received phase modulated carrier and said reconstructed carrier during said first interval and for feeding back said second signal indicative of phase error to said counter means during said second interval,
   whereby said second signal is generated for accurately indicating any error in said reconstructed carrier.

3. An improved synchronous digital demodulator as recited in claim 2 wherein said timing means comprises deriving means for deriving said input signal from said received phase modulated carrier and said reconstructed carrier, and
   gating means for gating said clocking signal to said counter means in said first interval only during occurrence of said derived input signal.

4. An improved synchronous digital demodulator as recited in claim 3 wherein said deriving means comprises multiplying means for obtaining a product of said reconstructed carrier and said received phase modulated carrier.

5. An improved synchronous digital demodulator as recited in claim 4 wherein said multiplying means comprises EXCLUSIVE OR gate means receiving as inputs said received phase modulated carrier signal and said reconstructed carrier signal, and providing as an output said derived input signal.

6. An improved synchronous digital demodulator as recited in claim 2 wherein said timing means comprises gating means for gating said clocking signal to said counter means during said second interval only for so long as necessary to reset said counter means.

7. An improved synchronous digital demodulator as recited in claim 1 wherein said counter means is operable for producing said first signal upon reaching a predetermined threshold count representative of a decision threshold for said decoding means,
   said threshold count being equal to a full count of said counter means,
   whereby requirements for arithmetic circuitry are eliminated from the decoding means and the error correcting means.

8. A synchronous digital demodulator for a quadriphase shift key system including
   counter means operable for counting clock pulses during any one of a plurality of decoding intervals determined by occurrence of a predetermined relationship between a reconstructed carrier and a received signal and for providing decoded bit information upon reaching a first predetermined threshold count during said decoding intervals, and
   resetting means for thereafter counting up said counter means to a second predetermined count, thereby resetting said counter to a starting count for a subsequent one of said decoding intervals,
   said counter means including generating means for generating signals indicative of reaching said first and second predetermined counts thereby to indicate a decoding decision for the received signal in response to reaching of said first count,
   said counter means further including terminating means responsive to said signal indicative of reaching said second count for terminating said counting up of said counter.

9. A synchronous digital demodulator as claimed in claim 8 wherein said first and second predetermined counts are substantially identical, representing a full count of said counter means, and wherein said generating means is operable for providing said signals upon rollover of said counter means from said full count to a zero count.

10. A synchronous digital demodulator as claimed in claim 9 comprising timing means for determining a counting interval including said decoding interval therein and for generating a counting interval signal indicating existence of said counting interval,
    said counter means further comprising gating means responsive to said counting interval signal for differentiating between said rollover signal generated during said decoding interval and said rollover signal generated thereafter during counting up of said counting means,
    said gating means operable responsive to said rollover signal generated during said counting interval for outputting an information signal as said indication of said decoding decision for the received signal.

11. A synchronous digital demodulator as claimed in claim 10 wherein said counter means further comprises decoding interval gating means responsive to said counting interval signal and to said predetermined relationship between said reconstructed carrier and said received signal for providing said clock signals to be counted during said decoding interval.

12. A synchronous digital demodulator as claimed in claim 8 wherein said relationship between said reconstructed carrier and the received signal is periodic, and further comprising product means for generating a substantially periodic product signal representative of said relationship, said counter means responsive to said product signal by counting said clock pulses during predetermined portions thereof.

13. A synchronous digital demodulator as claimed in claim 12 wherein said product means comprises EXCLUSIVE OR gate means for generating said product signal as an output thereof, said EXCLUSIVE OR gate means connected for receiving said received signal on one input thereof and said reconstructed carrier on another input thereof.

14. A synchronous digital demodulator as claimed in claim 12 further comprising timing means for determining a counting interval including said decoding interval therein and for generating a counting interval signal indicating existence of said counting interval, said timing means operative for providing said counting interval signal with a predetermined duration determined to equal substantially a multiple of the period of said product signal.

15. A synchronous digital demodulator as claimed in claim 14 wherein said counter means further comprises gating means responsive to coincidence of said product signal and said counting interval signal for defining said decoding intervals and for providing said clock pulses to be counted only during said decoding intervals.

16. A synchronous digital demodulator as claimed in claim 14 wherein said timing means is operative for providing said counting interval signal with a duration substantially equal to a single period of said product signal.

17. A synchronous digital demodulator as claimed in claim 14 wherein said product means is operable to provide said product signal with first and second durations in accordance with the relationship between said received signal and said reconstructed carrier, and further comprising means for providing said clock pulses to said counter means at a frequency selected to provide a full count for said counter means for said first threshold count thereof, whereby occurrence of a rollover of said counter means from a full count to zero during said decoding interval differentiates decoding of the received signal as different transmitted values.

18. A synchronous digital demodulator as claimed in claim 17 wherein said product means is operable to provide said first and second durations such that said counter means counts up to substantially identical predetermined terminal counts at termination of said counting interval for all values of the received signal, whereby errors in said reconstructed carrier resulting in errors in said product signals produce deviations in the terminal count of said counter means upon termination of said counting interval.

19. A synchronous digital demodulator as claimed in claim 18 comprising error detecting means for determining deviation in said terminal count of said counter means from said predetermined value thereof, thereby to detect error in said reconstructed carrier.

20. A synchronous digital demodulator as claimed in claim 19 wherein said error detecting means comprises means for determining a time displacement of occurrence of a full count in said counter means subsequent to termination of said counting interval from a predetermined time therefor, said time displacement representative of said deviation in said terminal count of said counter means and thus of said error in said reconstructed carrier.

21. A synchronous digital demodulator as claimed in claim 20 wherein said means for determining a time displacement comprises means for detecting occurrence of a rollover signal from said counter means during an error detecting interval subsequent to termination of said counting interval, and means for counting said clock pulses subsequent to occurrence of said rollover signal or at a predetermined time period prior thereto during said error detecting interval, the number of pulses counted during said error detecting interval indicative of the error in said reconstructed carrier.

22. A synchronous digital demodulator as claimed in claim 20 wherein said means for determining a time displacement comprises means for detecting a condition of a preselected bit of said counter during a predetermined error detecting interval following said counting interval and corresponding to said predetermined time for occurrence of said full count subsequent to termination of said counting interval, and means for counting said clock pulses during occurrence of said condition of said preselected bit during said error detecting interval, whereby an error in said reconstructed carrier is detected and the magnitude and direction thereof determined by the number of pulses counted during said error detecting interval.

23. A synchronous digital demodulator as claimed in claim 22 wherein said means for detecting comprises means for detecting a condition of the most significant bit of said counter means during the error detecting interval.

24. A synchronous digital demodulator as claimed in claim 20 wherein said error detecting means comprises error magnitude detecting means for detecting magnitude of phase error in the reconstituted carrier, and error direction detecting means for detecting the direction of the detected error magnitude, said error magnitude detecting means comprising said means for determining a time displacement.

25. A synchronous digital demodulator as claimed in claim 24 wherein said error direction detecting means is responsive to decoded bit information provided by said counter means upon counting clock pulses during said decoding interval.

26. A synchronous digital demodulator for a phase shift key system including decoding means for detecting data represented by phase shifts of a received signal for successive baud intervals, said decoding means including counter means for counting clock pulses during decoding intervals for outputting signals indicative of information content of the received signals during said decoding intervals, error detecting means for detecting phase errors between a reconstructed carrier and a received phase modulated carrier of the received signals, said error detecting means including said counter means and operable during error counting intervals to obtain counts indicative of a magnitude of the phase error to be detected.

27. A synchronous digital demodulator as claimed in claim 26 wherein said error detecting means further includes means receiving said information indicating signals output by said counter means for determining a direction of the detected phase error and of a phase correction to be applied to said reconstructed carrier.

28. A synchronous digital demodulator as claimed in claim 26 wherein said error detecting means comprises means for causing said counter means to provide a count of pulses necessary to obtain a full count therein during said error counting intervals, the provided count indicating the detected phase error magnitude.

29. A synchronous digital demodulator as claimed in claim 28 wherein said error detecting means further includes means receiving said information indicating signals output by said counter means for determining a direction of the detected phase error and of a phase correction to be applied to said reconstructed carrier.

30. A method for synchronous digital demodulation in a phase shift key system comprising the steps of:
    decoding a received signal conveying data as a phase shifted carrier,
    generating a reconstructed form of the transmitted carrier,
    said decoding step comprising the step of counting clock pulse signals during a sequence of decoding intervals having predetermined durations and detecting whether a rollover condition results from said counting step, and
    detecting a phase error between said reconstructed carrier and the transmitted carrier
    wherein said detecting step comprises the further steps of detecting the magnitude of said phase error and determining the direction of said phase error,
    said step of detecting the magnitude of phase error comprising the step of counting pulses in an interval having a predetermined duration occurring subsequently to a decoding interval, and
    said step of determining the direction of said phase error comprising the step of detecting whether a rollover condition results from said counting step performed during said decoding interval.

* * * * *